July 20, 1926.

H. N. ATWOOD 1,593,325

COMPOSITE PACKING ELEMENT

Filed April 25, 1922

Inventor

H. N. Atwood.

By Lacey & Lacey, Attorneys

Patented July 20, 1926.

1,593,325

UNITED STATES PATENT OFFICE.

HARRY N. ATWOOD, OF SMITHFIELD, NORTH CAROLINA, ASSIGNOR TO RUBWOOD, INC., OF LAWRENCE, MASSACHUSETTS, A CORPORATION OF MASSACHUSETTS.

COMPOSITE PACKING ELEMENT.

Application filed April 25, 1922. Serial No. 556,369.

This invention relates to improvements in washers, packing gaskets, valve heads, and all elements of a similar nature which are employed for packing or similar purposes where a fluid-tight joint is required, and the primary object of the invention is to form such elements of a composition of materials which will adapt the elements to more effectually serve their packing and sealing functions. More specifically the invention contemplates the provision of an element of this general class made up of alternately arranged and intimately united plies of veneer or other fibrous material and rubber, the veneer or other fibrous plies possessing the property of swelling or expanding upon the absorption of moisture and being yet protected from deterioration by the rubber plies which latter plies serve not only this purpose but also as a bonding medium for the fibrous plies. Therefore the invention contemplates the provision of a washer, packing gasket, or similar element embodying plies of a material capable of expanding upon the absorption of moisture and protected and bonded by other plies which, being of rubber, are yieldable or elastic and thus present all of the advantages possessed by the ordinary rubber, leather, or fibrous washer or similar element.

Another object of the invention is to provide for the construction of an element such as referred to above from such materials assembled and united in such a manner that the element will possess the desired degree of yieldability, durability, and strength, will not be as liable to deterioration as are similar elements when formed solely from rubber, leather, or fiber, and will when installed insure of a more perfect fluid-tight fit than can be expected where other materials are employed.

In the accompanying drawings:—

Figure 1:
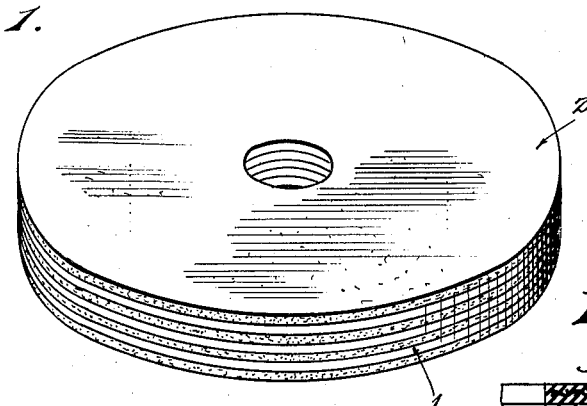
Figure 1 is a perspective view of a washer constructed in accordance with the invention.
Figure 6:
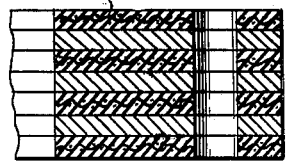
Figure 6 is a fragmentary sectional view on an enlarged scale of the structure shown in Figure 5.

The principles of the invention are applicable to packing elements of all kinds and of all sizes and shapes and therefore the three embodiments illustrated in the drawings are intended to be merely representative and are not to be considered in a restrictive sense. Regardless of the particular application of the invention, the article produced in accordance therewith will be made up of alternately arranged plies as illustrated for example in the instance of the washers shown in Figures 1 and 2 wherein the numeral 1 indicates plies of fibrous material such for example as veneer, which will expand to a greater or less extent upon the absorption of moisture, and the numeral 2 indicates plies of rubber or a similar material which will be yieldable or elastic to a desirable degree and capable of serving also as a bonding medium. In producing the packing element embodying the invention, in that form thereof illustrated in Figures 1 and 2 of the drawings, the wood veneer plies 1 are treated with some suitable rubber solvent, such for example as a solution of rubber and benzol, so that they will become impregnated to a greater or less degree with the solvent, and the bonding plies of rubber, in a substantially plastic state, are alternately arranged with the veneer plies, with two of the rubber plies outermost, and the assemblage of plies is then subjected to pressure and heat to effect vulcanization of the rubber plies, and during this step a greater or less percentage of the contained moisture in the wood plies 1 will be converted into steam, thus assisting the process of vulcanization and also reliquefying or converting to a plastic state the impregnated rubber solvent carried by the said wood plies and causing this solvent to take up and carry into the pores of the plies a greater or less quantity of the rubber of the rubber plies. As a result of the step of vulcanization, the material of the rubber plies becomes intimately incorporated with the wood plies so that the bond between the wood and bonding or rubber plies is more intimate than a superficial one. Preferably the arrangement of the plies is such, when for example the element or article to be produced is a washer or gasket, that two of the plies 2 will be outermost so that the article will possess a water-proof and yieldable or elastic surface, and the plies 1 will be to a great extent protected against deterioration through too complete absorption of water or any other fluid in the presence of which they are employed. However while the plies 2 serve in a great measure to protect the plies 1 from the deteriorating action of the water or other fluid, the peripheries of these plies are unprotected and as a consequence they will in a relatively short period of time after the installation of the element, become impregnated with the fluid and will swell or expand thus effecting a more perfect seal than would otherwise be obtained.

While the fibrous plies are preferably of veneer and therefore in themselves slightly yieldable, the presence of the rubber plies 2 will render the element yieldable, elastic, and compressible to the desired degree, especially in view of the fact that the plies are all of substantially the same thickness.

Figure 3:
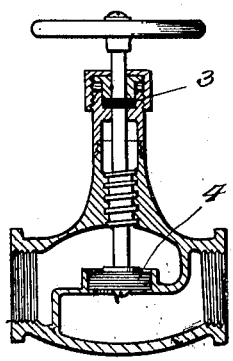
Figure 3 is a vertical sectional view through a valve of ordinary construction illustrating the application of the invention to washers and valve heads.

An example of the conditions under which the washer may be employed is illustrated in Figure 3 where it is arranged as indicated by the numeral 3, as a packing element about the stem of a cutoff valve of a well known type. In this instance the valve head which is indicated by the numeral 4 may likewise be made up of the fiber and rubber plies as previously explained.

Figure 4:
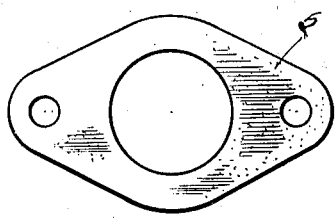
Figure 4 is a view in elevation of a gasket of a well known type embodying the invention.
Figure 5:
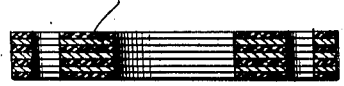
Figure 5 is a longitudinal sectional view through the gasket and illustrating a modification of the invention.

Figures 4 and 5 of the drawings illustrate a packing gasket of a well known type adapted for disposal between the ends of flanged pipes to be coupled, and as a modification of the invention, plies of foraminous material such for example as wire mesh, indicated by the numeral 5, may be embedded in the rubber plies which go to make up such an element. Of course the use of these foraminous plies is not restricted to gaskets such as shown in Figures 4 and 5 nor in fact to gaskets alone, as the rubber plies of any other kind of packing element such for example as the washers shown in Figures 1 and 2, may have embedded in them foraminous plies such as those shown in the said Figure 5.

Figure 2:
Figure 2 is a diametric sectional view therethrough.

The packing element shown in these figures is produced in the same manner as the packing element shown in Figures 1 and 2, except that at the time of preparing the relatively plastic rubber plies, the plies of foraminous material are embedded therein by applying the rubber material to the surfaces of the foraminous sheet and passing the composite sheet between calendering rolls so as to force the rubber material into the meshes or interstices of the foraminous sheet.

Having thus described the invention what is claimed as new is:—

1. A packing element comprising a yieldable, elastic and compressible flat-sided composite body of uniform thickness and of uniform structure throughout its thickness and consisting of alternate plies of rubber and wood veneer all of substantially the same thickness and intimately united into a composite whole by vulcanization, the plies, at the periphery of the body, being in marginal registration, whereby the wood veneer plies will be exposed at their margins to absorb moisture, two of the rubber plies being outermost and constituting facing plies.

2. A packing element comprising a flat-sided composite body of uniform thickness and of uniform structure throughout its thickness and consisting of alternate plies of rubber and wood veneer all of substantially uniform thickness and united into a composite whole by vulcanization, the plies, at the periphery of the body, being in marginal registration, whereby the wood veneer plies will be exposed at their margins to absorb moisture, and plies of metallic mesh embedded in the said rubber plies.

In testimony whereof I affix my signature.

HARRY N. ATWOOD. [L. s.]